Patented Jan. 1, 1952

2,580,474

UNITED STATES PATENT OFFICE 2,580,474

HERBICIDAL COMPOSITION

Frank J. Sowa, Cranford, N. J.

No Drawing. Application January 4, 1950,
Serial No. 136,849

20 Claims. (Cl. 71—2.7)

This application is a continuation-in-part of my copending application Serial No. 111,590, filed August 20, 1949.

This invention relates to compositions for use as herbicides or weed killers and to methods of producing and using such compositions.

Many types of herbicidal compositions have been developed heretofore but they generally are objectionable for any one or more of a number of reasons. Thus, for example, sodium chlorate is an effective weed killer but weeds and grass treated with this material are highly inflammable and therefore present a fire hazard along the right of way of a railroad or power line particularly in forested areas. Other herbicides are poisonous to animals and some compositions tend to irritate the skin so that they are dangerous to handle.

Most prior weed killers have further served to kill practically all vegetation to which they were applied and have not possessed any marked degree of selectivity. Therefore, they could not be used to destroy weeds in a lawn or elsewhere while leaving other grass or vegetation in a healthy condition. Moreover, those weed killers which act only by contact with the foliage of the plant are not always effective, since they are often washed off by rain or in watering a lawn, and they frequently serve to wither the foliage without killing the roots of the weeds or plants with the result that the weeds continue to grow from the uninjured roots.

In accordance with the present invention herbicidal compositions are provided which may be used on a wide variety of weeds and plants and by proper composition and application they may be employed selectively in order to kill certain plants without serious injury to other vegetation. The compositions are relatively non-poisonous to animals and there is reason to believe that weeds treated with such compositions are even repulsive to animals so as to reduce the danger of poisoning. Moreover, the compositions are not injurious to the skin, and therefore may be safely handled.

An important feature of the present invention resides in the selective action of the compositions in killing crab grass and plantain without destroying the more desired grasses. Furthermore, they act both by contact with the foliage and by absorption through the root system whereby plants may be effectively destroyed even though the composition is washed off or does not come directly in contact with the foliage.

The compositions of the present invention contain as their essential active ingredient those coordination complexes of boron trifluoride and alkanol amines which are described and claimed in said co-pending application. Apparently they vary somewhat in their action and selectivity.

One of the objects of the present invention is to provide a new type of herbicidal composition.

Another object of the invention is to provide herbicidal compositions which are selective in their action and are not actively poisonous or injurious when handled.

A further object of the invention is to provide novel methods for destroying vegetation.

These and other objects and features of the present invention will appear from the following description thereof in which typical compositions and methods are cited for the purpose of indicating the nature of the present invention but without intending to limit the scope of the invention thereby.

As described in my co-pending application referred to above, a new class of chemical compounds results from reaction between boron trifluoride and alkanol amines. The resulting compounds have the general formula:

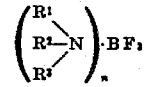

Where $R^1$ is an alkanol radical, $R^2$ and $R^3$ are selected from the group consisting of hydrogen, hydrocarbon radicals and alkanol radicals, and $n$ is a number from 1 to 3. All of the compounds of this class appear to be useful as herbicides. However, those compounds of the class wherein there is an alkyl group containing 8 or more carbon atoms generally have the properties of a wetting agent, and therefore may be used by themselves and applied in the form of a solution of the compound in a suitable solvent. Those compounds of the class in which there is no long chain alkyl group are generally employed in combination with a wetting agent in order to insure the most effective results by spreading of the composition over the leaves of the plants and by more effective absorption of the composition through the root system of the plant.

The compositions of the present invention generally are prepared for shipment or storage in the form of concentrates containing from, say 60% up to 90% of the complex dissolved in a solvent such as an alcohol. However, they are diluted for use and preferably are applied to vegetation in the form of solutions containing from 0.10 to 10.0% by weight of the active ingredient dissolved or dispersed in an aqueous medium. The solutions as used are further characterized by a surface tension less than about 65 dynes per square centimeter at 23° C. so that they tend to spread over the surface of plants to which they are applied and are effectively absorbed by the root systems of the plants.

The coordination complexes of boron trifluoride with alkanol amines form three different series in which the ratio of the alkanol amine to the boron trifluoride is 1 to 1, 2 to 1 and 3 to 1. In general those compounds of the class described wherein the ratio of the amine to $BF_3$ is 1 to 1 are more vigorous in their killing action, whereas those compounds in which the amine and $BF_3$ are in the ratio of 2 to 1 or 3 to 1 are generally milder and more selective in their action. The compounds which contain lower alkyl groups are usually much more soluble in water than are the compounds containing long chain alkyl groups such as those wherein there are 8 or more carbon atoms in the chain. The latter type of compounds are usually soluble in water to a sufficient extent to be effective as herbicides used on crab grass or plantain, but when the long chain amine type of compound is used for killing poison ivy and similar more stubborn growth they are generally employed in the form of a solution in an organic solvent such as Stoddard solvent for example.

The concentration of the boron trifluoride alkanol amine complex in a herbicidal composition will vary depending upon the particular compound used and the purpose for which it is employed. Generally when the composition is in the form of an aqueous solution and is used for killing weeds the concentration should be from about ½ to 5% and it is applied by spraying the area to be treated at the rate of 16 gals. of the solution per 1000 sq. ft. When selective killing of weeds is desired the preferred concentration is from about 1 to 2% of the compound by weight. Thus it is generally found that those compositions containing from about ½ to 2% by weight of an alkanol amine-$BF_3$ complex in the 3 to 1 ratio dissolved in water will kill crab grass in a lawn while leaving the normal grass unaffected. In tests conducted by the Rutgers University Agricultural School, 83% of the crab grass was killed when 9 gals. of lauryl diethanol amine $BF_3$ complex (2 to 1) was added to 360 gals. of water and applied to one acre of crab grass infected vegetation. The discoloration of the grasses remaining after such treatment was "moderate." It was further found that the same compound gave 93% control of crab grass when applied as three successive applications, each of which contained 2¼ gals. of complex in 360 gals. of water to acre. Discoloration was "none" to "slight."

Such concentrations also have little or no effect upon broad leaf plants such as plantain and dandelion. However, when the concentration of the solution or its rate of application is increased so as to apply from 15 to 25 gals. of the complex to an acre it is found to kill broad leaf plants as well as crab grass, whereas when the concentration is above about 25 gals. to the acre the composition will generally kill all grass and weeds in a lawn or other area. Compositions applied at the rate of 75 gals. or more to the acre have been found effective in killing poison ivy. One application of the herbicidal composition sprayed upon the vegetation is generally sufficient to kill substantially all of the weeds or undesired grasses, although two and sometimes three applications may be used, and in many cases it is preferable to use two or more applications of a relatively dilute solution several days apart, since there is less discoloration of the desired grasses under such conditions. The rate of application also may be varied depending upon the age of the crab grass plants. Young tender shoots require less severe treatment than older and more mature plants. It is also found that when application of the composition takes place on hot dry days it is more effective than when the air is moist and cool.

It is found that those compounds which contain the amine and boron trifluoride in the ratio of 1 to 1 are more vigorous as weed killers, and therefore when selectivity is desired, as when killing crab grass in a lawn, it is generally preferable to use compounds which contain the amine and boron trifluoride in the ratio of 2 to 1 or 3 to 1. Typical compositions which have been found to be particularly effective may be produced as follows:

Example 1

3 mols of isopropanolamine are dissolved in isopropyl alcohol and gaseous boron trifluoride is bubbled rapidly into the amine solution while the inlet tube for the $BF_3$ is kept below the surface of the liquid. The reaction is exothermic and the reaction mass is cooled on a water bath to keep the temperature below about 55° C. 1 mol of $BF_3$ is absorbed in this manner in about 9 hours. A wetting agent is added to the reaction mixture, and for this purpose there may be used any of the usual wetting agents such as ethylene oxide polymer, sodium salt of sulfonated castor oil, dioctyl sodium sulfo succinate, long chain alcohol sulfate and other conventional wetting agents.

The composition obtained is conveniently made up for use and shipping so as to have the following proportions:

75 parts isopropanolamine·$BF_3$ (3:1)
15 parts isopropyl alcohol
10 parts wetting agent This composition is readily soluble in water for application to vegetation and when mixed with water may be applied at the rate of from about 1 to 15 gals. of the concentrate per acre, depending upon the degree of infestation of crab grass. At such concentrations of the active ingredient it is effective for killing crab grass while leaving broad leaf plants and normal grasses substantially unaffected. When applied in concentrations of 15 to 25 gals. of complex per acre the compositions will kill both crab grass and broad leaf plants without permanent injury to normal grasses. When applied in concentrations above 25 gals. it will kill substantially all grasses, and when used at the rate of 75 gals. per acre it will kill poison ivy. The surface tension of the aqueous solution containing 1% of the above composition is 43 dynes per square centimeter at 23° C.

Example 2

2 mols lauryl diethanolamine are dissolved in isopropyl alcohol and gaseous $BF_3$ is introduced below the surface of the liquid while keeping the mixture agitated and cooled to a temperature below about 55° C. 1 mol of $BF_3$ is absorbed in this manner in about 3 hours. The mixture is prepared for use as a weed killer by adjusting the composition to the following proportions:

75 parts lauryl diethanolamine·$BF_3$ (2:1)
25 parts isopropyl alcohol

This composition when used is applied as described above in connection with composition of Example 1. In some respects the best concentration for use in killing crab grass is found to be at the rate of 9 gals. per acre of the concentrate dissolved in 360 gals of water. When the composition was applied in three separate applications of three gals. of concentrate each of 360 gals. of water per acre 93% of the crab grass was killed with only very slight discoloration of remaining grasses. The specific gravity of the concentrate is .935 so that one gallon weighs approximately 7.8 lbs. The preferred rate of application on the basis of weight is accordingly about 70 lbs. per acre which may be divided into three applications of convenient dilution for spraying. No additional wetting agent is required, since the complex itself has the properties of a wetting agent and a 1% solution has a surface tension of 36 dynes per square centimeter at 23° C.

In using each of the compositions described above the grass initially tends to turn brown, but it soon revives and in some instances, particularly when using the composition of Example 2, there is actually an improvement in the grass remaining, since it seems more hardy and responds somewhat as when treated with hormones. When the compositions are sprayed on the leaves of plants the leaves wither and the plant dies, indicating an effective killing action by contact. However, the compositions are also absorbed by the root system of the plants, as indicated by application of the compositions only about the roots of plants. In such applications the plant dies and an analysis of the leaves of the dead plant show that there is a relatively high concentration of boron indicating that the herbicidal agent has been absorbed by the root system and carried throughout the plant.

In some applications of the herbicidal agents it is desirable to use an organic solvent for the amine·BF₃ complex, and for this purpose Stoddard solvent, xylol or hydrocarbon oils may be used. Such solvents are particularly desired when the complex contains long alkyl radicals or is relatively insoluble in water. The amount of the complex used when employing an organic solvent is generally less than when an aqueous solution is employed.

In addition to the herbicidal compositions specifically cited above, it appears that any of the compounds of the class consisting of the coordination complexes of alkanol amines and boron trifluoride may be employed. Thus each of the following compounds has been used and found effective in killing crab grass and other vegetation when dissolved in water and applied at the rate of 1 to 75 gals. of complex per acre.

Monoethanolamine · BF₃ (1 to 1)
Monoethanolamine · BF₃ (2 to 1)
Monoethanolamine · BF₃ (3 to 1)
Monoisopropanolamine · BF₃ (1 to 1)
Monoisopropanolamine · BF₃ (3 to 1)
Octyl diethanolamine · BF₃ (2 to 1)
Octyl diethanolamine · BF₃ (3 to 1)
Lauryl diethanolamine · BF₃ (1 to 1)
Myristyl diethanolamine · BF₃ (1 to 1)
Myristyl diethanolamine · BF₃ (2 to 1)
Myristyl diethanolamine · BF₃ (3 to 1)
Cetyl diethanolamine · BF₃ (1 to 1)
Cetyl diethanolamine · BF₃ (2 to 1)
Cetyl diethanolamine · BF₃ (3 to 1)
Stearyl diethanolamine · BF₃ (1 to 1)
Stearyl diethanolamine · BF₃ (2 to 1)
Stearyl diethanolamine · BF₃ (3 to 1)
Phenylethanolamine · BF₃ (1 to 1)
Phenyldiethanolamine · BF₃ (1 to 1)
Ethyl phenylethanolamine · BF₃ (1 to 1)

Those compounds of the above group which contain 8 or more carbon atoms in the alkyl group do not require the addition of a wetting agent to the composition whereas those containing less than 8 carbon atoms are usually used in combination with a wetting agent in order to reduce the surface tension of the composition.

While typical and preferred compositions and methods of producing the same are cited above it will be evident that other compounds of the class consisting of the coordination complexes of boron trifluoride and alkanol amines may be used. It will also be apparent that the concentration of the active ingredient in the composition as applied to plants or grasses may be varied considerably depending upon the type of vegetation treated and the result desired. It will also be apparent that the composition may be produced and shipped in concentrated form for dilution by the user prior to application.

In view thereof it should be understood that the particular compositions cited and the methods of producing and using such compositions are intended to be illustrative only and are not intended to limit the scope of the invention.

I claim:

1. An herbicidal composition consisting of a liquid medium containing isopropyl alcohol and up to 90% by weight of a coordination complex of boron trifluoride and an alkanol amine having the composition indicated by the formula

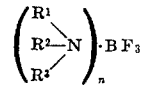

where R¹ is an alkanol radical, R² and R³ are selected from the group consisting of hydrogen, hydrocarbon radicals and alkanol radicals, and $n$ is a number from 1 to 3, such composition being characterized by the fact that an aqueous solution thereof containing 1% of said complex has a surface tension below about 65 dynes per square centimeter at 23° C.

2. An herbicidal composition consisting of a solution containing isopropyl alcohol and from about 60 to 90% by weight of a coordination complex of boron trifluoride and an alkanol amine having the composition indicated by the formula

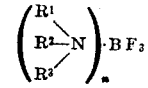

where R¹ is an alkanol radical, R² and R³ are selected from the group consisting of hydrogen, hydrocarbon radicals and alkanol radicals, and $n$ is a number from 1 to 3, said composition being characterized by the fact that an aqueous solution thereof containing 1% of said complex has a surface tension below about 65 dynes per square centimeter at 23° C.

3. An herbicidal composition consisting of a solution containing a solvent, a wetting agent, and up to 90% by weight of a coordination complex of boron trifluoride and an alkanol amine having the composition indicated by the formula

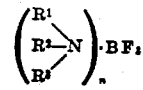

where $R^1$ is an alkanol radical, $R^2$ and $R^3$ are selected from the group consisting of hydrogen, hydrocarbon radicals and alkanol radicals, and $n$ is a number from 1 to 3, said composition being characterized by the fact that an aqueous solution thereof containing 1% of said complex has a surface tension below about 65 dynes per square centimeter at 23° C.

4. An herbicidal composition consisting of an aqueous solution containing from about 0.10 to 10% by weight of an isopropanol amine·BF₃ complex, together with a wetting agent, said composition having a surface tension below about 65 dynes per square centimeter at 23° C.

5. An herbicidal composition consisting of an aqueous solution containing from about 0.10 to 10% by weight of an isopropanol amine·BF₃ complex wherein the ratio of the amine to boron trifluoride is 3 to 1, together with a wetting agent, said composition having a surface tension below about 65 dynes per square centimeter at 23° C.

6. An herbicidal composition consisting of an aqueous solution containing from about ½ to 5% by weight of an isopropanol amine·BF₃ complex wherein the ratio of the amine to boron trifluoride is 3 to 1, together with a wetting agent, said composition having a surface tension below about 65 dynes per square centimeter at 23° C.

7. An herbicidal composition consisting of approximately 75 parts by weight of isopropanol-amine·BF₃ complex (3:1), 25 parts by weight of isopropyl alcohol, and sufficient wetting agent so that when said composition is added to water to the extent necessary to produce a solution containing from 0.10 to 10% by weight of the complex, said solution will have a surface tension below about 65 dynes per square centimeter at 23° C.

8. An herbicidal composition consisting of approximately 75 parts by weight of lauryl diethanolamine·BF₃ complex (2:1) and 25 parts by weight of isopropyl alcohol.

9. An herbicidal composition consisting of an aqueous solution containing from about 0.10 to 10% of a lauryl diethanolamine·BF₃ complex, said soluton having a surface tension below about 65 dynes per square centimeter at 23° C.

10. An herbicidal composition consisting of an aqueous solution containing from about 0.10 to 10% of a lauryl diethanolamine·BF₃ complex wherein the ratio of the amine to boron trifluoride is 2 to 1, said solution having a surface tension below about 65 dynes per square centimeter at 23° C.

11. An herbicidal composition consisting of a solution containing a coordination complex of an alkanol amine and boron trifluoride wherein the amine embodies an alkyl radical containing at least 8 carbon atoms, said complex being dissolved in a solvent and being present in amount equal to from about 0.10 to 10% by weight of the composition.

12. An herbicidal composition consisting of a solution containing a coordination complex of an alkanol amine and boron trifluoride wherein the amine embodies an alkyl radical containing at least 8 carbon atoms, said complex being dissolved in a hydrocarbon solvent and being present in amount equal to from about 0.10 to 10% by weight of the composition.

13. The method of killing vegetation which comprises the step of applying thereto a solution containing from 0.10 to 10% by weight of a coordination complex of boron trifluoride and an alkanol amine.

14. The method of selectively killing crab grass which comprises the step of spraying vegetation including crab grass with an aqueous solution containing from ½ to 2% by weight of a coordination complex of boron trifluoride and alkanol amine, at the rate of about 16 gallons of solution per 1000 square feet of vegetation.

15. The method of selectively killing crab grass and broad leaf plants which comprises the step of spraying vegetation including crab grass and broad leaf plants with an aqueous solution containing from ½ to 3% by weight of a coordination complex of boron trifluoride and alkanol amine, at the rate of about 16 gallons of solution per 1000 square feet of vegetation.

16. The method of selectively killing crab grass and broad leaf plants which comprises the step of spraying vegetation including crab grass and broad leaf plants with an aqueous solution containing from ½ to 3% by weight of a coordination complex of boron trifluoride and isopropanol-amine wherein the ratio of the amine to the boron trifluoride is 3 to 1, at the rate of about 16 gallons of solution per 1000 square feet of vegetation.

17. The method of selectively killing crab grass and broad leaf plants which comprises the step of spraying vegetation including crab grass and broad leaf plants with an aqueous solution containing from ½ to 3% by weight of a coordination complex of boron trifluoride and lauryl diethanolamine wherein the ratio of the amine to boron trifluoride is 2 to 1, at the rate of about 16 gallons of solution per 1000 square feet of vegetation.

18. The method of killing vegetation which comprises the step of applying thereto a solution containing from 0.10 to 10% by weight of a coordination complex of an alkanol amine and boron trifluoride dissolved in an organic solvent.

19. An herbicidal composition suitable for use in selectively killing crab grass in the presence of other vegetation and consisting of a solvent and from 60 to 90 percent by weight of a coordination complex of boron trifluoride and an alkanol amine wherein the ratio of the amine to the BF₃ is an integer selected from the numbers 2 and 3.

20. A composition for selectively killing crab grass in the presence of other vegetation which comprises an aqueous solution containing from ½ to 2% by weight of a coordination complex of boron trifluoride and an alkanol amine, the ratio of the amine to BF₃ being an integer selected from the numbers 2 and 3.

FRANK J. SOWA.

REFERENCES CITED

The following references are of record in the file of this patent:

UNITED STATES PATENTS

| Number | Name | Date |
| --- | --- | --- |
| 2,238,068 | Miller | Apr. 15, 1941 |